US009367552B1

(12) United States Patent
Williams

(10) Patent No.: US 9,367,552 B1
(45) Date of Patent: Jun. 14, 2016

(54) SYSTEM AND METHOD FOR EVENT REGISTRATION

(71) Applicant: Joel Robert Williams, San Jose, CA (US)

(72) Inventor: Joel Robert Williams, San Jose, CA (US)

(*) Notice: Subject to any disclaimer, the term of this patent is extended or adjusted under 35 U.S.C. 154(b) by 16 days.

(21) Appl. No.: 14/328,835

(22) Filed: Jul. 11, 2014

(51) Int. Cl.
*G06F 15/00* (2006.01)
*G06F 17/30* (2006.01)
*G06F 3/12* (2006.01)

(52) U.S. Cl.
CPC ........ *G06F 17/30091* (2013.01); *G06F 3/1203* (2013.01); *G06F 3/1257* (2013.01); *G06F 3/1268* (2013.01); *G06F 17/30896* (2013.01)

(58) Field of Classification Search
CPC ............... G06F 17/30091; G06F 17/30896; G06F 3/1268; G06F 3/1257; G06F 3/1203
See application file for complete search history.

(56) References Cited

U.S. PATENT DOCUMENTS

| | | | | |
|---|---|---|---|---|
| 7,172,113 | B2 | 2/2007 | Olenick | |
| 8,608,054 | B2 | 12/2013 | Bascombe | |
| 2001/0041994 | A1* | 11/2001 | Kim | G06Q 10/02 705/5 |
| 2003/0233332 | A1* | 12/2003 | Keeler | G06Q 20/206 705/64 |
| 2005/0218224 | A1 | 10/2005 | Boldin | |
| 2006/0081703 | A1 | 4/2006 | Tran | |
| 2012/0044528 | A1* | 2/2012 | Shibuta | G06F 3/1204 358/1.15 |
| 2012/0215571 | A1* | 8/2012 | Bracken | G06Q 50/265 705/5 |
| 2012/0322411 | A1* | 12/2012 | Lazarev | H04W 12/06 455/411 |
| 2013/0124398 | A1* | 5/2013 | Carroll | G06Q 99/00 705/39 |
| 2014/0324616 | A1* | 10/2014 | Proietti | G06Q 30/0601 705/26.1 |

FOREIGN PATENT DOCUMENTS

WO    WO0221896 A2    3/2012

OTHER PUBLICATIONS

Desystems, Printed Jun. 20, 2014 "Case Study for Color On-Demand Badge Printing" http://www.epsilonregistration.com/color-onsite-badge-printing-case-study.asp , p. 2.
Cvent, Printed Jun. 20, 2014 "Event Registration Software" http://www.cvent.com/en/event-management-software/event-registration.shtml.
Eventtrack, Printed Jun. 20, 2014 "Event Track" http://www.identexsolutions.com/index.php?option=com_content&view=article&id=274&Itemid=275#track-using-mobile-device.
Desystems, Printed Jun. 20, 2014, "Event Registration Software", http://www.desystems.com/en/ers/.
Boomset, Printed Jul. 1, 2014 "Kiosk Check-in" https://www.boomset.com/kiosk-self-checkin-app.
Expologic, Printed Jul. 1, 2014 "On-Site Trade Show Registration "http://ww2.expologic.com/onsite-registration.

* cited by examiner

*Primary Examiner* — Benjamin O Dulaney

(57) ABSTRACT

A self-contained multi-station registration system for registering users at a point of registration is disclosed. The registration system provides a registration web page to registration stations at the point of registration. The registration system further receives registration information from the registration stations, wherein the registration information is associated with the users. The registration system then prints the registration information at the point of registration and saves the registration information for later use. Also, the registration system requires no access to public or corporate networks.

20 Claims, 7 Drawing Sheets http://server.com/registration — 306

Event Name — 308

Please register here and a badge will automatically be printed — 310

First Name*  John — 312
Last Name*   Doe — 314
Company Name*  Acme Corp. — 316
Title        Engineer — 318
E-mail address  JohnDoe@acmecorp.com — 320

SUBMIT — 322    RESET — 324

SYSTEM AND METHOD FOR EVENT REGISTRATION

BACKGROUND INFORMATION

Organizers of an event such as a conference, a meeting, a social gathering, etc., generally find it difficult to cost effectively register multiple users at a same time such as at the beginning of the event and to print name badges for the users.

Typically, single computer systems having a laptop and a low cost printer are used for on-line registration of users, session scheduling, or payment capabilities for an event. However, such systems register one user at a time and print name badges for the users. These systems further create congestion and delays when multiple users desire to register at the event at a same time. Further, other systems rely on additional, complex and/or proprietary hardware and special application software installed therein. However, the additional hardware is then required to synchronize with a remote server in order to create a unified database for the users. Further, such systems often require public Internet to synchronize with the server and/or the printer. Therefore, the conventional systems fail to register multiple users at the same time at a point of registration.

Based on the foregoing, systems and techniques are desired for registering multiple users and for printing name badges for the users at a point of registration.

SUMMARY

Embodiments in accordance with the present invention provide a computer-implemented method for registering a plurality of users at a point of registration. The method includes providing, by at least one web server in an isolated wireless local area network, at least one registration web page to a plurality of unmodified registration stations at the point of registration, receiving registration information from the plurality of unmodified registration stations, wherein the registration information is associated with the plurality of users, and printing the registration information at the point of registration, wherein the registration information is provided by the at least one web server.

Embodiments in accordance with the present invention provide a self-contained multi-station registration system for registering a plurality of users at a point of registration at essentially the same time. The registration system comprises at least one printing device, a processor, and a memory, coupled to the processor, the memory comprising instructions executable by the processor. The instructions include providing, by a web server in an isolated wireless local area network, at least one registration web page to a plurality of unmodified registration stations at the point of registration, receiving registration information from the plurality of unmodified registration stations, wherein the registration information is associated with the plurality of users, and printing the registration information at the point of registration, wherein the registration information is provided by the web server.

Embodiments in accordance with the present invention provide a computer-implemented method for registering a plurality of users at a point of registration at essentially the same time. The method includes providing, by at least one web server in an isolated wireless local area network, at least one registration web page to a plurality of unmodified registration stations at the point of registration, receiving registration information from the plurality of unmodified registration stations, wherein the registration information is associated with the users, storing the registration information received in at least one registration database, and printing the registration information at the point of registration, wherein the registration information is printed based on at least one predefined badge template, wherein the registration information is provided by the at least one web server.

Embodiments of the present invention may provide a number of advantages depending on its particular configuration. First, the present invention may be a self-contained multi-station event registration system. The registration system is self-contained as the registration system may be installed at a point of registration, for example, at a venue of an event. The registration system may be simultaneously connected with multiple registration stations. Further, the registration system may include, but is not limited to, a server that is configured to provide registration web pages to the multiple registration stations, and a badge printer to print name badges for users. The registration system further includes a local area network capable of connecting the server to the registration stations and therefore, the registration system does not require public internet access to connect the server with the registration stations or to provide the functionality described herein. Hence this local area network is an isolated local area network. The isolated located area network may be referred to as a wireless or wired network of the registration system to communicate with unmodified registration stations, which is not coupled to any other network.

Next, the registration system facilitates self-registration by the users at the registration stations. The users may manually enter the registration information, or a registrar at the point of registration may enter the registration information on behalf of the users. Also, registration information provided by the users may be stored at the server. The registration information may also be printed on name badges at the point of registration, which may be worn by the users during the event. Further, the registration station does not require additional hardware and/or software particular to the registration system.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 3 illustrates an exemplary diagram of a registration web page, in accordance with an embodiment of the present invention;

Figure 1:
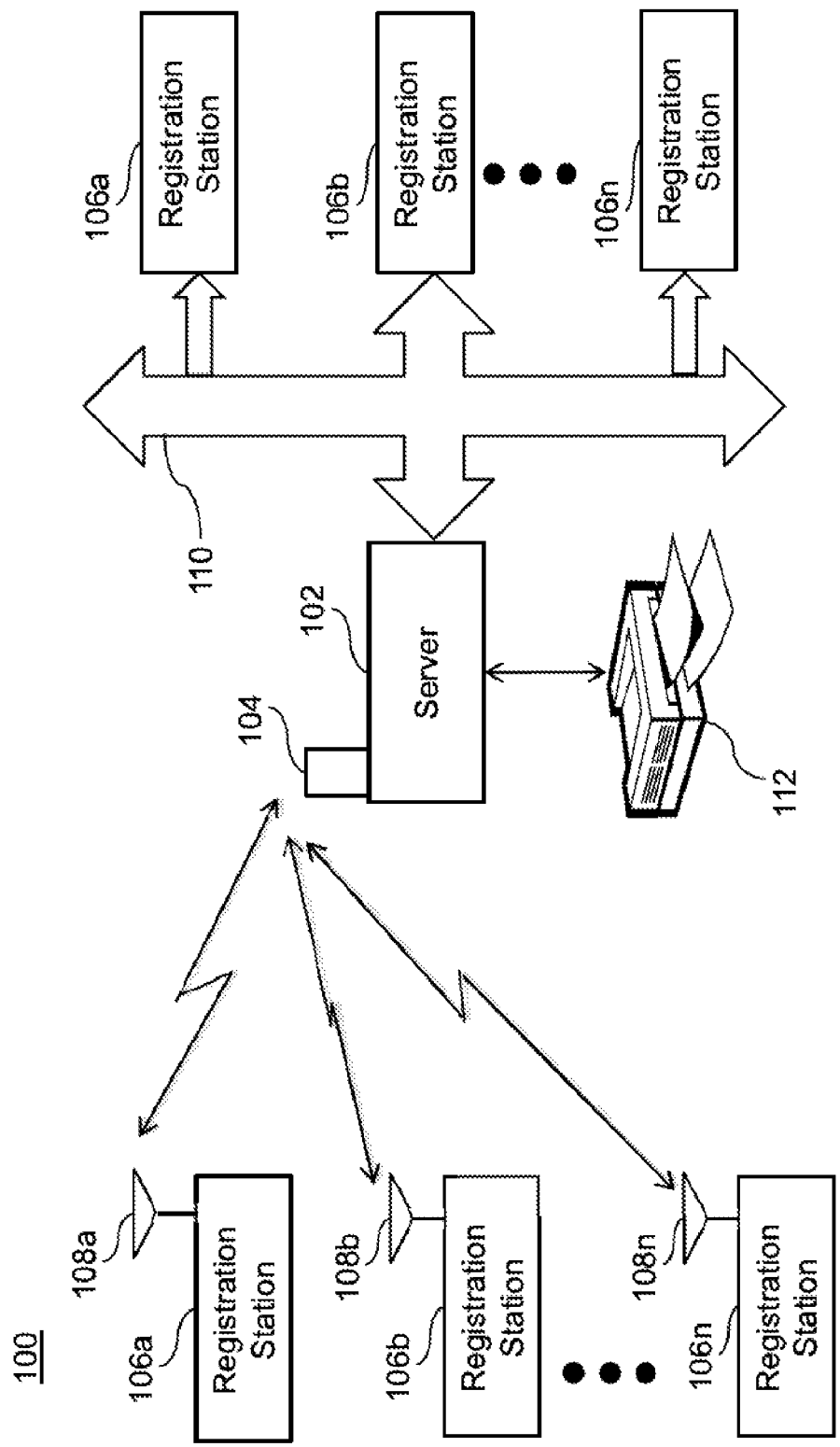
FIG. 1 is a diagram of a self-contained registration system for registering users at a point of registration, in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DESCRIPTION OF THE PREFERRED EMBODIMENT

An apparatus, method, and system for registering multiple users at a point of registration, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a self-contained multi-station registration system 100 capable of registering users at a point of registration. In an implementation of the present invention, the users may be an attendee of an event, an organizer, or an administrator of the event. In one embodiment of the present invention, the registration system 100 may be capable of simultaneously registering multiple attendees at a point of registration. The event may be, but is not restricted to, an exhibition, a volunteer event, a seminar, a trade show, a meeting, and the like. Further, the registration system 100 is capable of collecting registration information of the attendees from registration stations. The registration information may include, but is not restricted to, a name, a company name, a title, an email address, a phone number, and so forth. Also, the registration system 100 may be capable of storing the registration information of the attendees at a registration repository. In one embodiment of the present invention, the registration information may be stored in a registration database of the registration system 100. In another embodiment of the present invention, the registration information may be stored in multiple registration repositories of the registration system 100. Further, the registration system 100 may be capable of printing name badges having the registration information of the attendees at the point of registration. The printed name badges may be worn by the attendees during the event, in an embodiment of the present invention.

For the purpose of illustration, the registration system 100 employs, in certain embodiments of the present invention, a server 102 having a wireless network access point 104, or similar wireless network capabilities. In an embodiment of the present invention, the wireless access point may be, but is not limited to, an antenna. The wireless access point may be implemented according to wireless communication standards such as, but is not limited to, Wi-Fi. The server 102 may further include an Ethernet interface for connecting to an isolated wired local area network 110. In an embodiment of the present invention, the server 102 may include, but is not restricted to, a dedicated standalone single board computer. The dedicated standalone single board computer may further include, but is not limited to, a Central Processing Unit (CPU), a memory, a wireless network interface, an Ethernet network interface, a Universal Serial Bus (USB) port, etc., The server 102 may alternatively include software that may be installed on a computing device and/or on a general purpose computer that may provide the same functionality as the single board computer.

The wireless isolated local area network and the wired isolated local area network of the system are not coupled to any other network.

In an embodiment of the present invention, software of the server 102 may be used with a computing device, for example, a laptop, a desktop computer, or any other general purpose computer that may provide similar functionality as the aforementioned single board computer. A combination of the software and the general purpose computer constitutes the server 102. In an embodiment of the present invention, the software may be installed on the computer or located in a thumb drive or other removable media, or installed on non-removable memory of the computing device. When the software is activated, network interfaces of the computer may then be used to provide connectivity to the registration stations 106. Further, the badge printer 112 may be coupled by using a Universal Serial Bus (USB) port of the computer, or one of the network interfaces. The general purpose computer may additionally include functionality of a registration station 106. A web browser of, for example, a laptop, may be connected to the registration system 100 via a local loop-back virtual network, commonly known as 'localhost'. Hence, this feature may allow the laptop to function as both the registration station 106 and the registration system 100.

In some embodiments of the present invention, the badge printer 112 may be coupled to the server 102 using the USB port, or by using an isolated local area network. In another embodiment of the present invention, the badge printer 112 may be integrated within the badge printer 112. Further, in some embodiments of the present invention, multiple printers may be coupled to the same server 102.

Further, the server 102 may be simultaneously connected to various registration stations 106*a*-*n*. The registration station 106 may be any device capable of connecting to a wireless and/or wired isolated local area network and capable of displaying registration web pages provided by the server 102, and supplying user provided information back to the server 102. The software functionality is typically provided by the web browser and related software. The hardware may be any of a number of types of commonly available, well known, devices, for example, a desktop computer, a laptop, a tablet computer, or a smartphone that may include either suitable wireless and/or wired networking capabilities. No special hardware or software is required particular to the registration system. Hence the registration station is unmodified for use with the registration system. The term "unmodified" herein means that the registration stations do not require additional hardware and/or software in particular with the registration system 100.

Further, the registration stations 106 are used at the point of registration. In an embodiment of the present invention, the registration stations 106 may be provided by a host and/or organizer of the event and or the registration stations 106 may be provided by the attendees of the event, similar to the well-known "Bring Your Own Device (BYOD) capability. The registration stations 106 may be used by the attendees of the event to register for the event at the point of registration.

The attendees of the event may provide the registration information by using the registration stations 106. In an embodiment of the present invention, the registration stations 106 may enable the attendees to manually enter the registration information. A registrar may enter the registration information on behalf of the attendees, in another embodiment of the present invention. In a further embodiment, either the attendee or the registrar may enter registration information.

The registration stations 106 may communicate with the server 102 through various isolated local area networks (LAN) by using any suitable isolated wireless local area networks composed of 108 a-n and 104 or wired isolated local area networks 110. The networks may include, but are not limited to, a data network, a wireless network, and the like. For illustrative purposes, the networks may be any suitable wired and/or wireless local area networks that are not coupled to other networks. It is further contemplated that the networks may include components and facilities to provide signaling and/or bearer communications between the various components or facilities of the registration system 100. Further, the wireless network may employ various technologies including, for example, Code General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, for example, microwave access (WiMAX), Wireless Fidelity (Wi-Fi), and the like that form an isolated local area network, not coupled to any other network.

Further, the registration information provided by the attendees of the event may be transmitted to the server 102. The server 102 may then store the registration information for future usage. Next, the server 102 may be connected to a badge printer 112. In an embodiment of the present invention, the badge printer 112 may be connected to the server 102 through a Universal Serial Bus (USB) port. The badge printer 112 may be connected to the server 102 through an isolated local area network at the point of registration, according to another embodiment of the present invention. In one implementation of the present invention, the server 102 may be integrated within the badge printer 112. In an embodiment of the present invention, the registration information may be received over a wireless or wired isolated local area network at the point of registration.

The badge printer 112 may be used to print name badges having the at least some of the registration information for the attendees of the event at the point of registration. In an embodiment of the present invention, the badge printer 112 may print the name badges based on a predefined badge template. In another embodiment of the present invention, badge templates may be generated by the registration system 100. Further, the predefined badge template may be customized based on the registration information provided by the users (i.e., attendees and/or administrators). The name badges may be worn by the attendees during the event, in an embodiment of the present invention.

In an exemplary embodiment of the present invention, the server 102 includes a web server. The server 102 provides a registration web page to the registration stations 106 when the attendees enter a web address or a Uniform Resource Locator (URL). The attendees of the event enter their registration information on the web page. The registration information is then stored in a database of the server 102. Further, name badges for the attendees of the event are printed by the badge printer 112.

In an exemplary embodiment of the present invention, the server 102 may also provide at least one configuration page that may be used to configure the registration web page, the badge printer 112, or a combination thereof. The configurations of the server 102, the badge printer 112, or a combination thereof may be changed by the organizers of the event based on their need. For example, the registration system 100 is initially utilized at a volunteer group meeting event, then the server 102 may display a registration web page having text fields such as, a name, attendees interests, how they heard about the meeting, an email ID, and the like, and then the registration system 100 may be relocated to another event such as a company open house then the web server 102 may change the configuration of the registration stations 106 that may display a registration web page having text fields such as, a name, a attendee's company name, a designation, and the like. The components of the server 102 are described in conjunction with FIG. 2.

Figure 2:
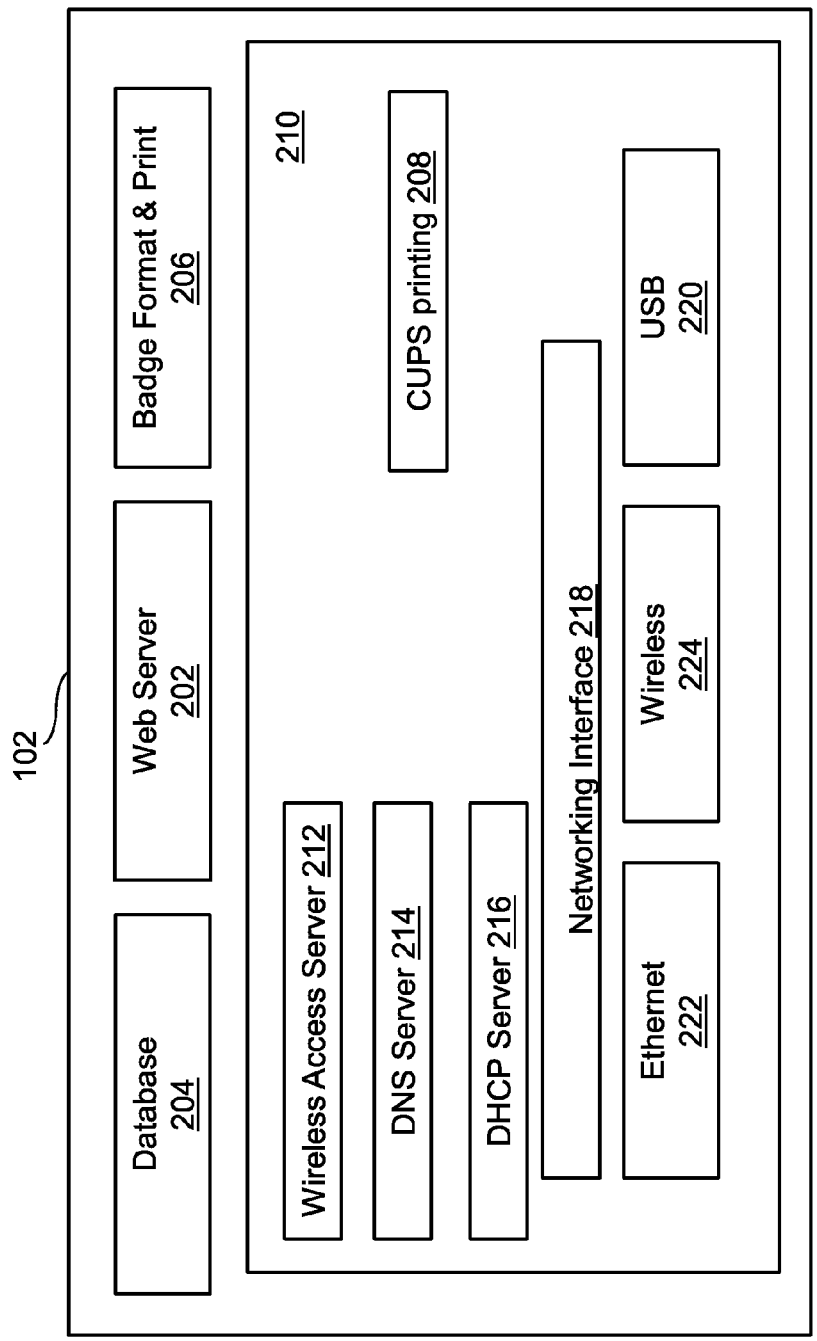
FIG. 2 is a diagram of components of a server of the registration system, in accordance with an embodiment of the present invention.

FIG. 2 is a diagram of components of the server 102 for managing an event, according to one embodiment of the present invention. The server 102 may include a web server 202, a registration database 204, a badge format and print module 206, and an operating system 210.

The web server 202 may provide a registration web page to registration stations 106 based on requests received from the registration stations 106, in one embodiment of the present invention. The registration web page may include, but is not limited to, a registration form having text fields in which attendees of an event enter their registration information to register for an event. The registration web page may also include, but is not limited to, graphical control elements such as radio buttons, check boxes, drop-down lists, etc., that may help the attendees to fill the registration form. In an embodiment of the present invention, the web server 202 may provide the registration web page simultaneously to multiple registration stations 106 located at the event. This may enable multiple attendees of the event to simultaneously register for the event. Further, the web server 202 may provide at least one configuration page to facilitate configuration of the server 102. In an embodiment of the present invention, the configuration may include, but is not limited to, define what information is to be displayed on the registration stations 106, important text fields on the registration web page, customizing the registration web page according to events, and the like.

The web server 202 may provide for configuration of the badge printer 112. In one embodiment of the present invention, the configuration page may be used to customize the format of name badges. In another embodiment of the present invention, the predefined badge template may be customized based on the registration information. The registration information to be printed on the name badges may include only some of the registration information provided by the attendees, such as an attendee name, and a company name, but may not include a phone number. It may further include information about the event or event sponsor including, but is not limited to a graphics image such as an organization logo and/or an image of the event, etc.

The URL provided by the registration station 106 may refer to the registration web page or to any unrecognized web address. The server 102 may provide a captive portal capability, wherein unrecognized URLs are automatically redirected to the registration web page. Some registration stations 106 may automatically attempt to access an unrecognized URL when they are initially connected to the wireless and/or wired isolated local area network. These may be similarly handled by the server 102, resulting in a display of the registration web page to the user without the need for the user to enter a URL. registration station Further, the web server 202 may receive registration information provided by the attendees of the event on the registration web page. The attendees may manually enter the registration information in the registration web page, according to an embodiment of the present invention. The attendees may enter the registration information by using the graphical control elements. In another embodiment of the present invention, a registrar at the event may enter the registration information on behalf of the attendees.

The registration database 204 may store the registration information received from the registration stations 106 by the web server 202. In an embodiment of the present invention, the database 204 may create a database file to store the registration information received from the registration stations 106. The registration system 100 may create a new database file each time the registration system 100 is initiated at the event. Further, each time the registration information is received and/or validated, a new record is added to the database file. In an embodiment of the preset invention, format of the database file may be, but is not limited to, a Comma Separated Value (CSV) file format (.csv file format). This type of file format may include a line of American Standard Code for information interchange (ASCII) text for each of the records in the database file. Further, each record of the database file may include data fields that may be separated by commas, in an embodiment of the present invention. Further, the server 102 may include a database (not shown) to store configuration data of the server 102, in an embodiment of the present invention.

The web server 202 may export the stored registration information to a device external to the point of registration. The database file may be retrieved from the registration database 204 by various easy and convenient means. In an embodiment of the present invention, the database file may be copied to a flash memory thumb drive.

The badge format and print module 206 may be used to print name badges of the attendees of the event. In an embodiment of the present invention, the badge format and print module 206 may print the name badges based on the configuration of the badge printer 112. The badge format and print module 206 may print at least some of the registration information based on predefined badge templates, in another embodiment of the present invention. The badge and print module 206 may also be configured to generate badge templates according to the event. Also, the predefined badge template may be customized based on the registration information, in an embodiment of the present invention.

The server 102 may also include an Operating System (OS) 210. In an embodiment of the present invention, the Operating System (OS) may be a, but is not limited to, a LINUX platform. The OS may further include various modules such as, a Common UNIX Printing System (CUPS) printing module 208, a Wireless Access server module 212, a Domain Name Server (DNS) server 214, a Dynamic Host Configuration Protocol (DHCP) server 216, and a networking interface module 218 that may facilitate operation of a wireless network interface 224, an Ethernet interface 222, and a USB port 220 when coupled to a USB network device.

In an embodiment of the present invention, the CUPS printing module 208 may include job queuing software that may schedule printing jobs received from the registration stations 106. The CUPS printing module 208 may provides the name badge information to one or more printers. The badge and print module 206 along with the CUPS printing module 208 may be activated by the web server 202 when the attendees submits the registration information, according to an embodiment of the present invention.

The wireless access server 212 may include, but is not limited to, well known "hostapd" software that may work with the wireless network interface 224 to provide an access point functionality to the wireless network access point 104 of the server 102. This functionality may facilitate the registration stations 106 to connect to the server 102.

Further, the DNS server 214 and the DHCP server 216 may provide a captive network portal capability to the registration system 100. In an embodiment of the present invention, the DHCP server 216 may be used to provide a local non-routable Internet Protocol (IP) address to the registration stations 106. In another embodiment of the present invention, the DNS server 214 and web server 202 may redirect any unrecognized URL request from the registration stations 106 to the registration web page of the web server 202. For example, if an attendee provides an unexpected URL in a web address field of a web page then the DNS server 214 automatically redirects the attendee to the web server 202 which further provides a registration web page. The captive network portal may require no initial configuration of the registration stations 106 in order to access the registration web page. Further, the captive network portal purposely limits the attendees of the event to registration related functions only. It is important to note that no connection to the public Internet or enterprise network is required.

The networking interface is a software module 218 that may provide communication between the server 102 and the registration stations 106 through the network interfaces Wireless 224, Ethernet 222, and/or USB when coupled to a USB network device. Further, the networking software module 218 may be used to couple the badge printer 112. The networking interface module 218 may facilitate the communication between the server 102 and the registration stations 106 through the USB port 220 when the USB port accommodates a network interface. In another embodiment of the present invention, the server 102 may be installed in a general purpose computer and co-resident with a registration station 106 on the same general purpose computer, the registration station 106 is coupled to the server 102 through a virtual network loopback interface, usually referred to as "localhost". This provides the same functionality as a wired network and forms an internal "virtual" isolated local area network. Hence for the purposes of explanation this loopback interface is considered to be a wired network.

In some embodiments of the present invention, coupling of the server 102 and the registration stations 106 may be facilitated through the USB 220, Ethernet 222, wireless network interface 224 or in some embodiments, through the virtual loopback network interface either singularly or in any combination.

FIG. 3 illustrates an exemplary diagram of a web browser 300 that displays a registration web page 302 on a registration station, in accordance with an embodiment of the present invention. The web browser 300 may be any suitable web browser, including, but not limited to well-known web browsers such as Internet Explorer™, Safari™, Chrome™, etc.

A web browser control window 304 may include, but is not limited to, a field where a user enters a URL 306. The web page 302 provided by the server 102 is displayed in the page area of the web browser 300 of the registration station 106.

Further, an event name 308 may be displayed on the registration web page 302. In an embodiment of the present invention, an event logo may be displayed on the registration web page 302. The event name 308 may be displayed with an event logo on the registration web page 302, in another embodiment of the present invention.

A message 310 may also be displayed to the attendee of the event to provide registration information a name badge may then be printed for the attendees. For the registration, the attendees may have to enter some registration information in the registration web page 302 in text fields. The registration information may include, but is not restricted to, a first name 312, a last name 314, a company name 316, a title 318, an email address 320, etc. In an embodiment of the present invention, some of the text fields may be marked with an asterisk that may indicate the attendees are required to provide the information in order to complete the registration.

The attendees may then submit the registration information by clicking on a submit button 322. The attendees may also reset the registration information by clicking on a reset button 324.

Figure 4:
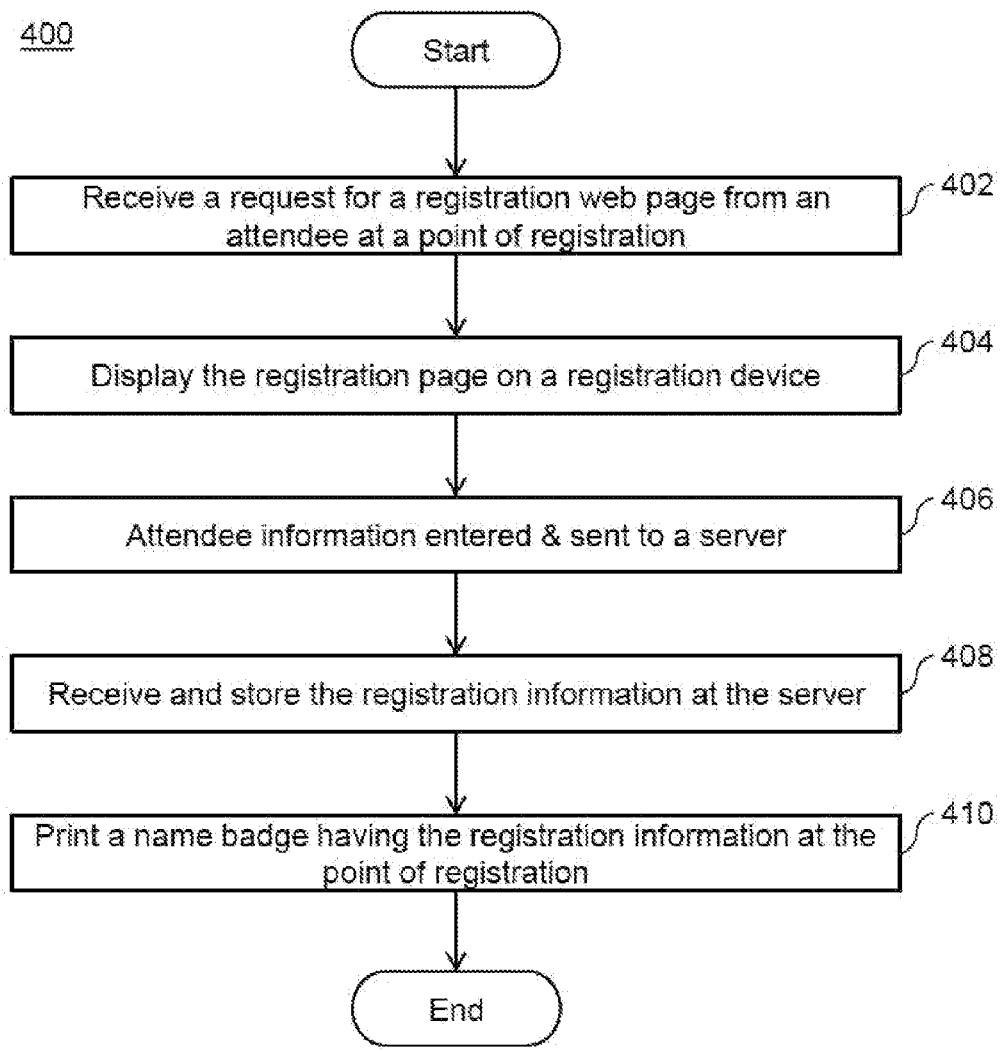
FIG. 4 is a flowchart of a process for registering users at a point of registration, in accordance with an embodiment of the present invention.

FIG. 4 is a flowchart of a process 400 for registering users at a point of registration, according to another embodiment. At step 402, a registration system 100 receives a request for a registration web page from a registration station. An attendee of the event may request for the registration web page by entering a URL in a web browser of the registration station. The registration station may automatically request an unexpected URL when it is initially connected to the network. The server 102 may receive this request and respond with the registration web page. Hence, the user may not need to enter a URL in order to create the request.

At step 404, the registration system 100 displays the registration web page on the registration station. The registration web page may be, but is not limited to, a registration form having text fields, in an embodiment of the present invention. The text fields of the registration web page may also include, but is not limited to, graphical control elements such as radio buttons, check boxes, drop-down lists, etc., The registration web page may include text fields associated with, but is not limited to, a first name, a last name, a company name, a title, an email address, etc., The displayed page may also include an enterprise name, a logo, or a combination thereof.

At step 406, the attendee or a registrar on behalf of the attendee enters the registration information at registration station 106. The registration information is then sent to the server 102. Next, at step 408, the registration system 100 receives and stores the registration information at a server 102. In an embodiment of the present invention, the registration system 100 stores the registration information in the registration database of the server. In an embodiment of the present invention, the registration database may create a database file to store the registration information received from the registration station 106.

Thereafter at step 410, the registration system 100 prints a name badge for the attendee at the point of registration on a badge printer 112. In an embodiment of the present invention, the name badge may include at least some of the registration information provided by the attendee. The registration system 100 prints the registration information based on predefined badge templates, in an embodiment of the present invention. The registration system 100 may customize the predefined badge template based on the registration information, in an embodiment of the present invention. The attendee of the event may wear the printed name badge during the event.

Figure 5:
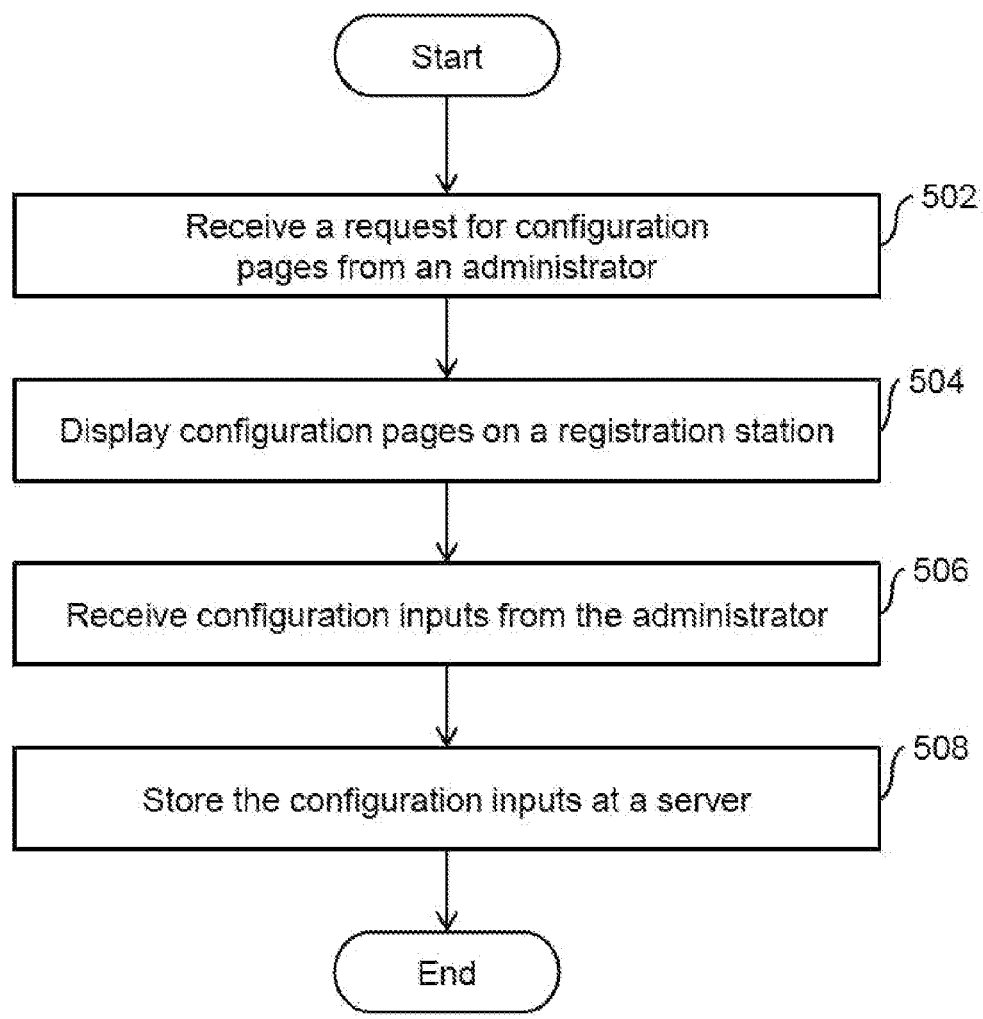
FIG. 5 is a flowchart of a process for configuring the server, in accordance with an embodiment of the present invention.

FIG. 5 is a flowchart of a process 500 for use by a system administrator for configuring a server. In an embodiment of the present invention, the server may include configuration pages that the administrators may use for configuring the registration page and badge templates, and for other system and printer configuration capabilities. The administrator uses a registration station or other similar computer to access the web server 202 of the server 102 by using a special URL. In some embodiments of the present invention, a password may be required prior to accessing the configuration pages. There is no link from the registration web page used by users to the configuration web pages. A request for a configuration page 501 from the administrator is received at step 502.

Thereafter, at step 503, the registration system 100 displays configuration pages on the registration station 106. The configuration may include, but is not restricted to, define what information is to be displayed on the registration stations 106, important text fields on a registration web page, customizing the registration web page according to events, and the like. In another embodiment of the present invention, the configuration page may also include, configuration of a badge printer 112. The configuration of the badge printer 112, may include, but is not limited to, define what information is to be printed on name badges, font and font size of text to be printed on name badges, position of an event name and/or logo of the event to be printed on name badges, etc., At step 506, the registration system 100 receives configuration inputs from the user. The configuration inputs are then stored in a server of the registration system 100, at step 508 for later use. In an embodiment of the present invention, the configuration inputs may be stored in a database file of the server 102.

In one embodiment of the invention, a default configuration is provided so that zero configuration is required in order to operate the registration system.

Figure 6:
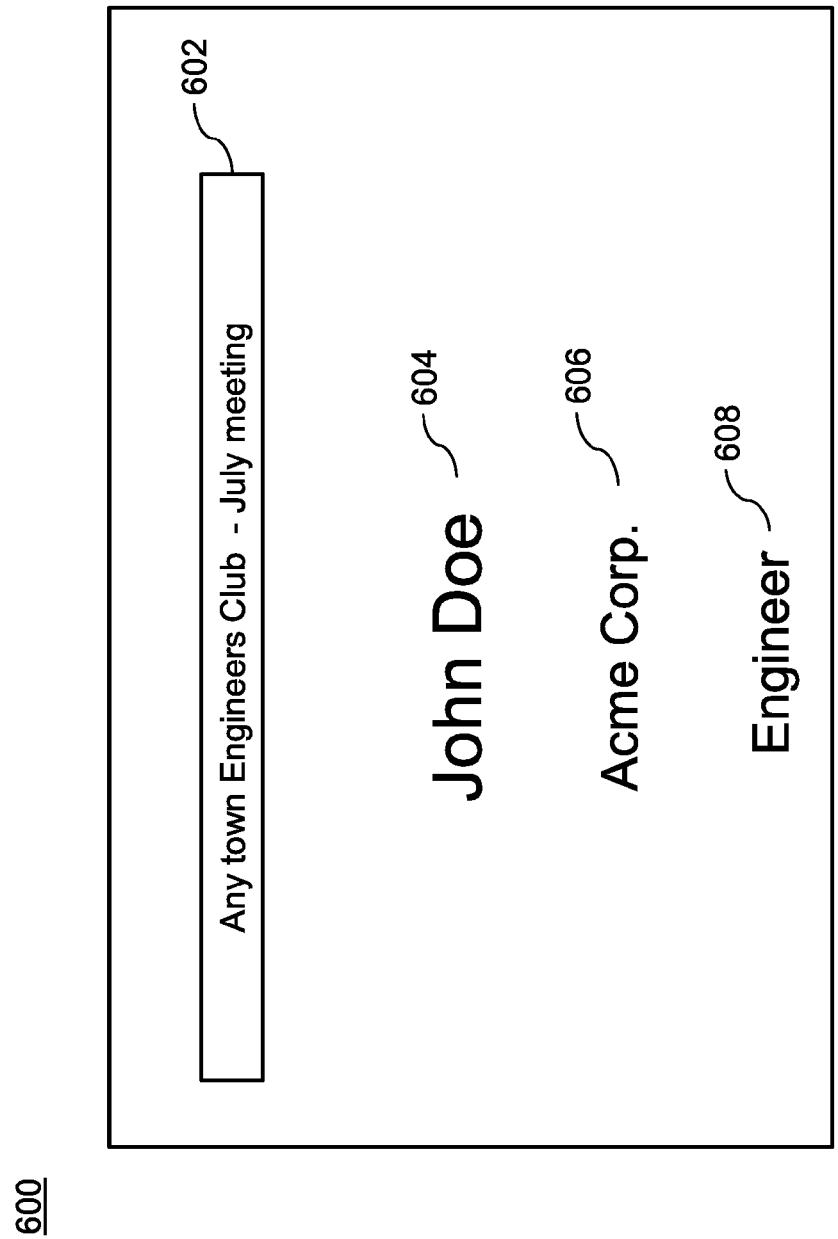
FIG. 6 illustrates an exemplary name badge printed from the badge printer.

FIG. 6 illustrates an exemplary name badge 600 that is printed for user registration information as depicted in the FIG. 3. The name badge 600 may include a banner 602. In an embodiment of the present invention, the banner 602 may be configured by an administrator of an event. The banner 602 may include, but is not restricted to, a name of a club, agenda of a meeting, date of a meeting, and the like. Further, the attendee's name is shown 604 and may be a concatenation of the first name 312 and the last name 314. The company name information entered 316 is also printed 606 on the name badge 600. The title information 318 is also printed 608.

Figure 7:
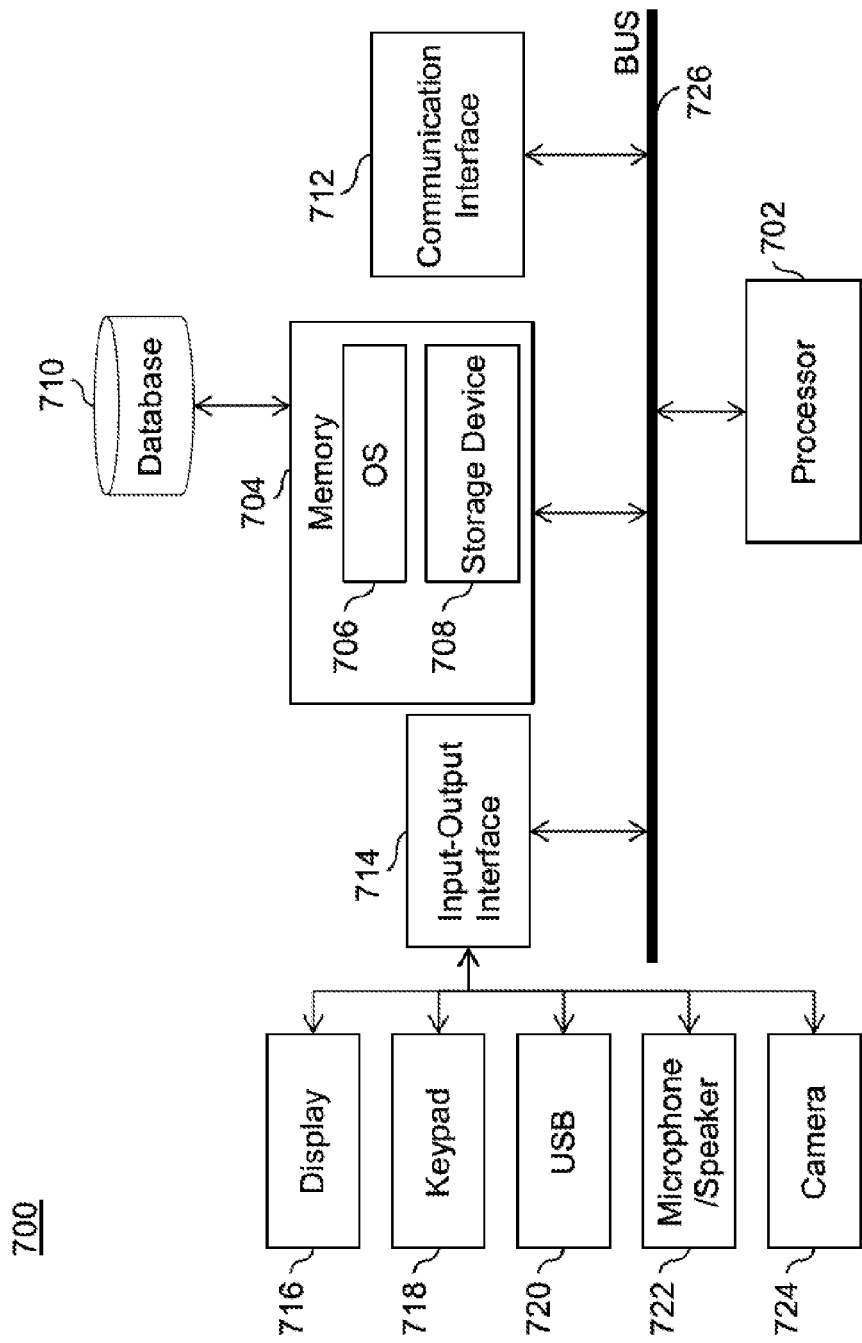
FIG. 7 is an exemplary diagram of a communication device that can be used to implement the registration station.

FIG. 7 illustrates an exemplary block diagram of a communication device 700, that can be used to implement a registration station in accordance with an embodiment of the present invention. The communication device 700 may be a small, handheld communication device, for example, a smartphone, a desktop computer, a tablet, or a smartphone. No modification to hardware or software particular to the registration system is required. The communication device 700 typically includes more functionality than is required to operate with the registration system, The communication device 700 may be used for other purposes in addition to use with the registration system. The communication device 700 includes a processor 702. The processor 702 may be a general purpose processor or a special purpose processor. The processor 702 of the communication device 700 may be a dual-core processor or a multi-core processor.

A memory 704 of the communication device 700 stores various programs, data and/or instructions. The instructions stored in the memory 704 of the communication device 700 may be executed by the processor 702 of the communication device 700. Examples of the memory 704 may include a Random Access Memory (RAM), a Read Only Memory (ROM), and so forth. The memory 704 may include an Operating System (OS) 706 for the communication device 700 to function. In an embodiment of the present invention, the memory 704 may further include a storage device 708. The storage device 708 may be used to store static information and instructions for the processor 702. The memory 704 may store applications as software or firmware on the communication device 700. The communication device 700 further includes a database 710. The database 710 may be any type of data storage known to a person skilled in the art. The database 710 may store any type of information required for operation of the communication device 700.

A communication interface 712 generally manages user inputs and a system output. The communication interface 712 enables the user to communicate over a communication network. The communication network may include, but is not restricted to, wireless or wired Local area Network (LAN), Wide Area Network (WAN), Metropolitan Area Network (MAN), and so forth.

An input-output interface 714 enables user interaction with the communication device 700. The input-output interface 714 may include, but is not restricted to, a display 716, a keypad 718, a Universal Serial Bus (USB) 720, a microphone/speaker 722, and a camera 724. Although not shown in the figure, other devices may be connected through the input-output interface 714 to the communication device 700. In an embodiment of the present invention, the display 716 may include a touch-sensitive screen. Therefore, the user may provide the inputs by touching the display 716. The keypad 718 may include devices and/or logic that may be used to operate the communication device 700. The keypad 718 may further be adapted to receive the user inputs, directly or via other devices, such as stylus for entering the user inputs. In an embodiment of the present invention, the user may use the keypad 718 for entering the inputs such as a name, a company name, a title, an email address, and so forth into the communication device 700. The USB 720 may be used as an external storage device used to store user registration information. The external storage device may be a compact disk (CD), a Digital Versatile Disk (DVD), a flash memory, an optical storage, and so forth. The microphone/speaker 722 and the camera 724 may be used to record the registration information. The camera 724 may further be used to take digital pictures of the user.

The communication device 700 includes a system bus 726 to connect multiple components described above. Examples of the system bus 726 may include several types of bus structures including a memory bus, or a memory controller, a peripheral bus, or a local bus using any of a variety of bus architectures. A Basic Input/Output System (BIOS) stored in the memory 704 such as Read Only Memory (ROM), may provide a basic routine that helps to transfer information between the components within the communication device 700, during start-up.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, flash, NVRAM, or magnetic or optical disks. Volatile media includes dynamic memory, such as main memory. Common forms of computer-readable media include, for example, a flash memory, a flexible disk, hard disk, or any other magnetic medium, magneto-optical medium, a CD, DVD any other optical medium, RAM, a PROM, and EPROM, a FLASH-EPROM, a solid state medium like a flash memory card, any other memory chip or cartridge, as described hereinafter, or any other medium from which a computer can read.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for registering a plurality of users at an event, comprising:
   providing, by at least one web server coupled to an isolated wireless local area network, at least one registration web page to a plurality of unmodified registration stations at a point of registration;
   receiving registration information from the plurality of unmodified registration stations, wherein the registration information is associated with the plurality of users; and
   printing at least one of the registration information on at least one printing device coupled to the at least one web server, wherein the registration information is provided by the at least one web server,
   wherein the at least one web server and the registration stations are not connected to any other network.

2. The method of claim 1, further comprising:
   storing the registration information received in at least one registration database.

3. The method of claim 2, further comprising:
   exporting the stored registration information to a removable flash memory drive coupled to the at least one registration database.

4. A method of claim 1, wherein the registration information is printed based on at least one predefined badge template.

5. The method of claim 1, wherein zero configuration of the at least one server is required to register the plurality of users and print a plurality of print name badges.

6. The method of claim 4, wherein the predefined badge template is customized based on the registration information.

7. The method of claim 1, wherein the registration information is received over a wired interface in an isolated wired local area network, not connected to any other network, at the event.

8. The method of claim 1, further comprising:
   providing at least one configuration web page for configuring the registration system.

9. The method of claim 8, further comprising:
   resolving one or more unexpected web addresses from the plurality of unmodified registration stations to an IP address of the web server provide the registration web page.

10. A self-contained multi-station registration system for registering a plurality of users at an event, comprising:
    at least one printing device;
    a processor; and
    a memory, coupled to the processor, the memory comprising at least one instruction executable by the processor, wherein the instruction comprising:
    providing, by at least one web server coupled to an isolated wireless local area network, at least one registration web page to a plurality of unmodified registration stations at a point of registration;
    receiving registration information from the plurality of unmodified registration stations, wherein the registration information is associated with the plurality of users; and
    printing at least one of the registration information on at least one printing device coupled to at least one web server, wherein the registration information is provided by the at least one web server and the at least one web server and the registration stations are not connected to any other network.

11. The system of claim 10, wherein the instruction further comprising:
storing the registration information received in at least one registration database.

12. The system of claim 11, wherein the instruction further comprising:
exporting the stored registration information to a removable flash memory drive coupled to the at least one registration database.

13. The system of claim 10, wherein the registration information is printed based on at least one predefined badge template.

14. The method of claim 10, wherein the registration information is received over a wired interface in an isolated wired local area network, not connected to any other network, at the event.

15. The system of claim 13, wherein the predefined badge template is customized based on the registration information.

16. The system of claim 10, wherein the instruction further comprising:
providing at least one configuration web page for configuring the registration system.

17. The system of claim 10, wherein the instruction further comprising:
resolving one or more unexpected web addresses from the plurality of unmodified registration stations to an IP address of the web server provide the registration web page.

18. A method for registering a plurality of users at an event, comprising:
providing, by at least one web server in an isolated wireless local area network, at least one registration web page to a plurality of unmodified registration stations at a point of registration;
receiving registration information from the unmodified registration stations, wherein the registration information is associated with the users;
storing the registration information received in at least one registration database; and
printing at least one of the registration information on at least one printing device coupled to at least one web server,
wherein the registration information is provided by the at least one web server and the at least one web server and the registration stations are not connected to any other network.

19. The method of claim 18, wherein the registration information is received over a wired interface in an isolated wired local area network, not connected to any other network, at the event.

20. The method of claim 18, further comprising:
resolving one or more unexpected web addresses from the plurality of unmodified registration stations to an IP address of the web server provide the registration web page.

* * * * *